Figure 1:
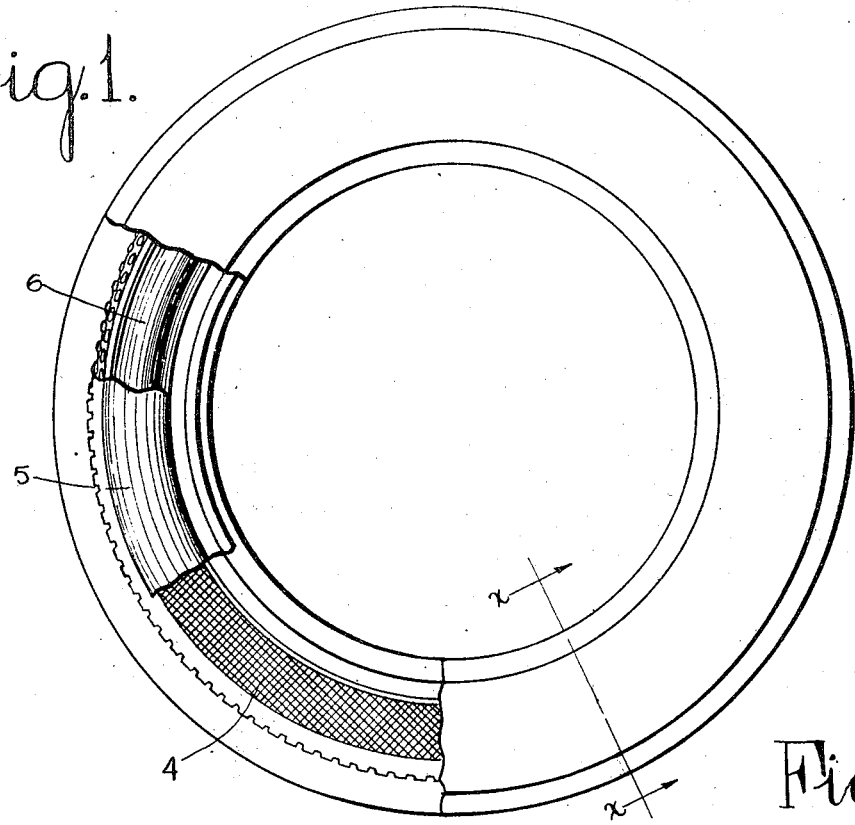

M. A. MARQUETTE.
TIRE MOLD.
APPLICATION FILED NOV. 24, 1920.

1,419,577. Patented June 13, 1922.

INVENTOR
Melvon A. Marquette
BY
Edward C. Taylor
ATTORNEY

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

1,419,577. Specification of Letters Patent. Patented June 13, 1922.

Application filed November 24, 1920. Serial No. 426,181.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in Tire Molds, of which the following is a specification.

This invention relates to an apparatus for making pneumatic tire casings and more particularly to tires made by the full molded method. Usually tires are molded by locating a metal core, with the carcass and tread built thereon, within a cast iron mold and applying pressure and heat to cause complete shaping and vulcanization of the tire.

In a full molded tire, a common source of weakness occurs in the form of a buckle above the bead which is caused by the flow of rubber from two directions meeting and pulling the fabric out of its proper alignment around the core. In order to form a clear cut tread and due to the placing of excessive stock at certain parts of the tire when built on the core, the bearing action between the core, with the tire built on it, and the mold is such that as the core is laid in the mold, there are two points of contact between the tire and the mold on each half-section, one at a point near the lower side wall portion of the tread and the other at the bead. As the molds close, a pressure is gradually exerted from the first point of contact to the top of the tread, pushing ahead of it a wave of rubber which fills the tread-forming part of the mold.

There is also a movement of rubber along the side walls and upper bead portion of the tire. As the molds close, there is an increase in pressure at all bearing points, as well as an increasing bearing surface starting from both of the initial bearing points to some point along the side wall due to the pressure exerted progressively toward that point. The two waves of rubber coming from opposite directions react against each other while there is still sufficient non-bearing contour to allow the reaction to pull the fabric up in a buckle, which is afterwards pressed down out of its natural alignment.

Another consideration is the pressure to which a carcass is subjected while being vulcanized. Too high a pressure will greatly impair the tensile and resilient qualities of the strain-resisting members of the carcass. A study of the normal components between which the carcass is compressed, together with what consideration can be given due to the padding action of thin and thick layers of rubber, shows that the greatest compression comes at the middle of the side wall. It is therefore very essential to prevent excessive pressure at this and adjacent points whenever possible.

The object of this invention is to provide a mold which will substantially eliminate any tendency toward buckling above the bead, as well as relieve excessive pressure on the side walls, and which will have all the good molding-qualities of an ordinary cast iron mold.

Figure 2:
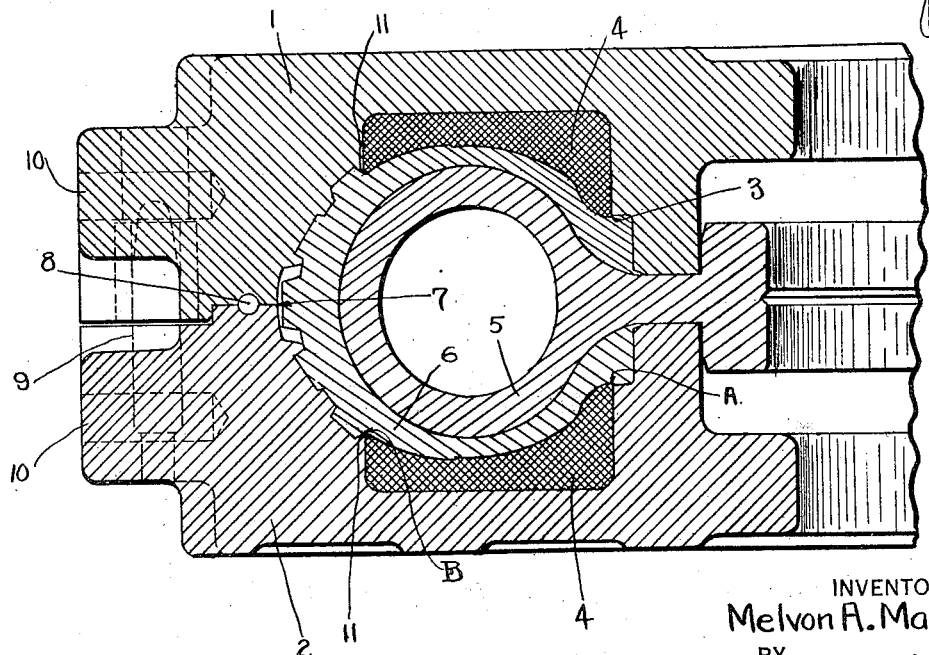

Fig. 1 shows a mold in plan view, partially broken away to show the tire, the tire core, and the lower mold section; and Fig. 2 is a sectional view through the mold on line XX of Fig. 1, showing clearly the annular mold insert.

Exclusive of the annular insert, the mold shown in Figs. 1 and 2 is of the usual type, consisting of the two sections 1 and 2 forming the molding cavity 3. At the top of the tread forming portion 7 of the mold is the excessive stock outlet pocket 8. Dowel pins, which hold the molds in position one to another are shown in dotted lines 9 while the recesses 10 are cut into the mold periphery every 90° to attach the lugs which pull the molds apart. The annular insert 4 which is the feature of this invention is shown in its position in the mold inner surface, extending from a point at the bottom of tread forming portion of mold 11, to a point just above the heel of the bead, the insert not being carried to the base of the bead since rigid mold portions cut a more clearly defined base.

As seen at A, Fig. 2, the upper face of the ring preferably extends slightly beyond the adjacent inside contour of the mold. When the tire and core are inserted and the molds closed but not placed under high pressure, the first points of bearing will be approximately at B, Fig. 2 and at the bead of the tire. Buckling above the bead will be practically eliminated because instead of an excessive pressure being exerted on the first two contact points, which increases on magnitude as the molds close as well as extends its bearing area slowly toward the side wall center, pushing waves of rubber ahead of it; there will be a compression of the insert at the first bearing points with a rapid increase in bearing surface so that before any excessive pressure is exerted at said places, pushing rubber toward points of less pressure, there will be sufficient bearing and pressure at all places along the side wall and upper bead portion to resist any rubber waves which may be formed and which tend to buckle the fabric. The resilient ring 4 will also prevent any excessive pressure from crushing the fabric on the side wall and will in no way interfere with the tread forming qualities of the mold.

The selection of the material used in the annular ring will be dependent upon the relative shapes of mold and core, the manner in which the tire stock is applied to the core, and the working ability of the substance to stand up under its hard usage. The preferred material is, however, vulcanized rubber fabric. Since there are many widely different embodiments of this invention without departing from the spirit of it, I do not wish to limit myself to any specific form of location or shape of the annular inserts except as specifically pointed out in the following claims. In particular, if a non-skid tread is not to be formed, it may be found desirable to locate the compressible portion of the mold at the tread rather than adjacent the beads.

Having thus described my invention, I claim:

1. A tire mold, having annular concave inside faces, annular grooves of substantial width and thickness cut in said faces, and annular rings of a firm but compressible material inserted in said grooves.

2. A tire mold having an inner face comprising a firm but easily compressible material conforming to a portion of the inner contour of the mold.

3. A tire mold having a rigid tread forming portion and a yielding side wall portion.

4. A tire mold comprising a firm but compressible side wall and bead forming portion whose inside contour protrudes from the adjacent inside contour of the mold.

M. A. MARQUETTE.